US010183357B2

(12) United States Patent
Weigl

(10) Patent No.: US 10,183,357 B2
(45) Date of Patent: Jan. 22, 2019

(54) METHOD AND DEVICE FOR QUICK AND RELIABLE TOOL CHANGING IN THE PROCESS OF FRICTION STIR WELDING

(71) Applicant: GRENZEBACH MASCHINENBAU GMBH, Ashbach-Baeumenheim (DE)

(72) Inventor: Markus Weigl, Donauwoerth (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 25 days.

(21) Appl. No.: 15/319,624

(22) PCT Filed: Jun. 22, 2015

(86) PCT No.: PCT/DE2015/000307
§ 371 (c)(1),
(2) Date: Dec. 16, 2016

(87) PCT Pub. No.: WO2016/004912
PCT Pub. Date: Jan. 14, 2016

(65) Prior Publication Data
US 2017/0320161 A1 Nov. 9, 2017

(30) Foreign Application Priority Data
Jul. 7, 2014 (DE) ......................... 10 2014 010 058

(51) Int. Cl.
*B23K 20/12* (2006.01)
*B29C 65/00* (2006.01)
(52) U.S. Cl.
CPC ........ *B23K 20/1255* (2013.01); *B23K 20/122* (2013.01); *B23K 20/123* (2013.01); *B29C 66/90* (2013.01)

(58) Field of Classification Search
CPC ........................................ B23K 20/122–20/128
(Continued)

(56) References Cited

U.S. PATENT DOCUMENTS

| 6,516,992 B1 | 2/2003 | Colligan |
| 7,661,572 B2 | 2/2010 | Nelson et al. |
| 2002/0050508 A1* | 5/2002 | Yoshinaga ........... B23K 20/123 228/112.1 |

(Continued)

FOREIGN PATENT DOCUMENTS

| DE | 102012010836 | 6/2013 |
| DE | 202012103219 | 12/2013 |

(Continued)

*Primary Examiner* — Kiley S Stoner
(74) *Attorney, Agent, or Firm* — Duane Morris LLP; J. Rodman Steele, Jr.; Gregory M. Lefkowitz

(57) ABSTRACT

Method and device for quick and reliable tool changing in the process of friction stir welding, comprising the following features: a) a robot (1) with a robot pivoting head (2) and a friction welding head (3) with a welding shoe (13), wherein the robot (1) can select a friction welding head (2) from a tool magazine (4), b) a device for sensing the mechanical forces at the welding pin tip (14) of each welding shoe (13) of a friction welding head (2), wherein a sensor (16) is attached to the frustoconical part of the tool (11), wherein a sensor (21) is provided, and wherein furthermore a sensor (25) is provided in the flared pin receptacle (26) and a piezoelectric force-measuring sensor (24) is provided in the longitudinal axis of the pin shaft (27) for measuring the axial force acting on the welding pin tip, c) an RFDI code provided on the pin shaft (27) of each welding shoe (13) for identification, d) a changing skid (28) provided on each welding shoe (13).

5 Claims, 6 Drawing Sheets

Figure 1:
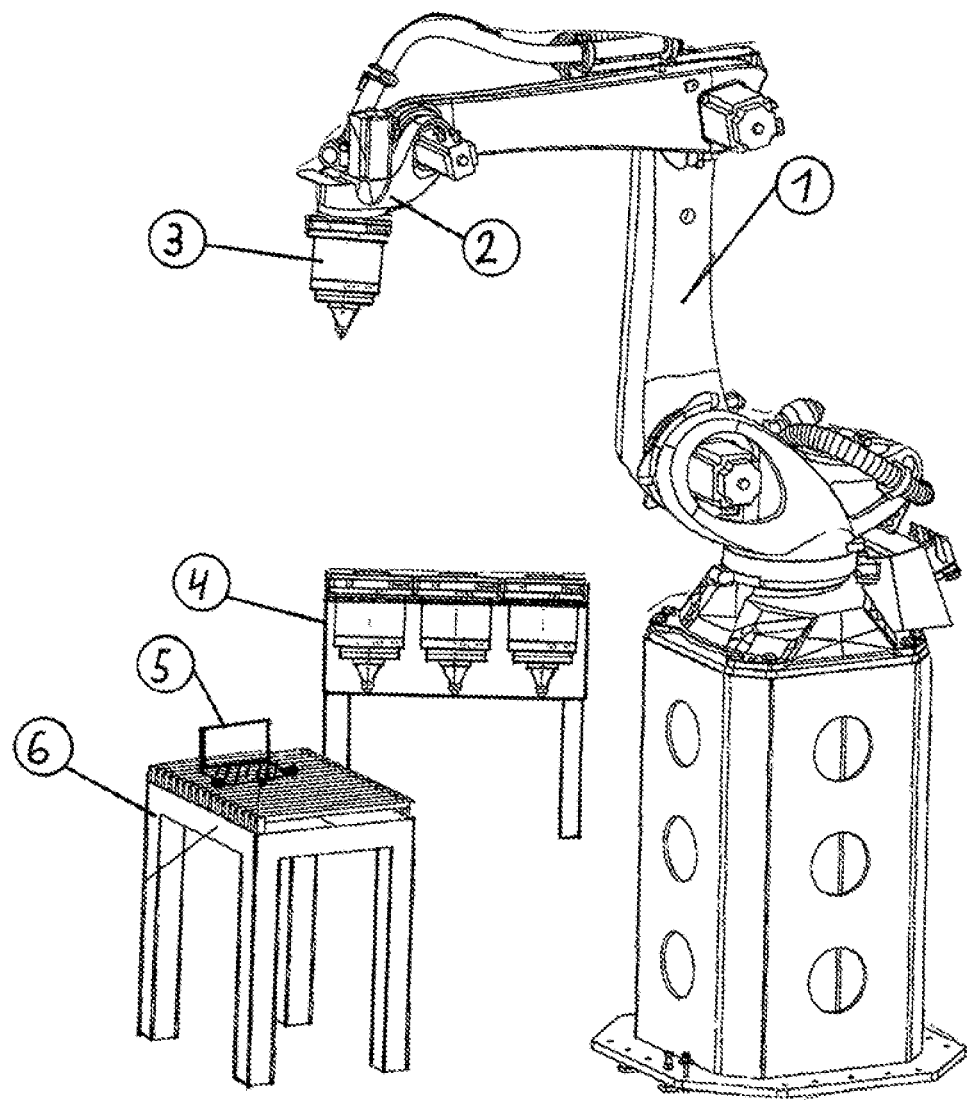

(58) Field of Classification Search
USPC .............................................. 228/112.1, 2.1
See application file for complete search history.

(56) References Cited

U.S. PATENT DOCUMENTS

| | | | |
|---|---|---|---|
| 2004/0050906 A1* | 3/2004 | Rice | B23K 20/1235 228/112.1 |
| 2006/0163316 A1* | 7/2006 | Burton | B23K 20/125 228/2.1 |
| 2007/0295781 A1 | 12/2007 | Hunt et al. | |
| 2008/0040911 A1 | 2/2008 | De Koning | |
| 2008/0154423 A1* | 6/2008 | Badarinarayan | B23K 20/123 700/175 |
| 2009/0272788 A1* | 11/2009 | Fukushima | B23K 20/1245 228/2.1 |
| 2012/0128445 A1* | 5/2012 | Hotte | F16B 17/006 411/82 |
| 2013/0239397 A1* | 9/2013 | Hotte | B21J 5/063 29/525 |
| 2014/0080690 A1* | 3/2014 | Noma | B23K 37/0229 483/55 |
| 2016/0008918 A1* | 1/2016 | Burford | B23K 20/1255 228/112.1 |
| 2016/0346869 A1* | 12/2016 | Weigl | B23K 20/1245 |

FOREIGN PATENT DOCUMENTS

| | | | |
|---|---|---|---|
| DE | 202014003072 | 4/2014 | |
| DE | 202014002642 U1 * | 5/2014 | |
| DE | 202014005571 U1 * | 9/2014 | |
| DE | 102014004331 B3 * | 6/2015 | ........... B23K 20/124 |
| DE | 102014005315 B3 * | 6/2015 | ........... B23K 20/123 |
| JP | H07237165 | 9/1995 | |
| JP | 2008036664 | 2/2008 | |
| JP | 2009190038 | 8/2009 | |
| KR | 100978104 B1 * | 8/2010 | |

* cited by examiner

METHOD AND DEVICE FOR QUICK AND RELIABLE TOOL CHANGING IN THE PROCESS OF FRICTION STIR WELDING

CROSS-REFERENCE TO RELATED APPLICATIONS

This application is a § 371 national stage entry of International Application No. PCT/DE2015/000307, filed on Jun. 22, 2015, which claims priority to German Patent Application No. 10 2014 010 058.8, filed Jul. 7, 2014, the entire contents of which are incorporated herein by reference.

The invention relates to a method and to a device for quick and reliable tool changing in the process of friction stir welding.

Friction stir welding was developed in the early nineties of the last century. Friction stir welding in the meantime is now successfully employed inter alia for welding aluminum alloys in many relevant industrial sectors. The applications herein range from individual pieces and small runs up to large volumes. Apart from the outstanding quality of the weld seam, the high level of reproducibility and the minor preparatory works and efforts for post-processing further contribute to the economic success. This method may be readily automated, permitting quality monitoring based on machine monitoring.

In the case of friction stir welding, friction heat by means of the friction between a rotating tool which is simultaneously moved in a translational manner and is impinged with pressure is generated in the joining region of the materials to be connected. The tool is moved along the joining region and stirs the plasticized material in the interior of the seam of the mutually abutting materials to be connected. The pressure exerted presses the plasticized material together. The tool is withdrawn from the connection region at the end of this seam, and the weld seam is capable of being immediately stressed.

The following publications are mentioned in relation to the prior art:

A pressure welding device which is based on the objective of demonstrating a process-based welding technique, in particular a friction stir welding technique, which is improved in comparison with the known prior art is known from DE 20 2012 103 219 U1. To this end, the preamble of claim 1 proceeds from a process-based welding device, having a plasticizing installation and a compressing installation, for producing a welded connection between workpiece parts, wherein the process-based welding device has a clamping device, rotatable about a rotation axis, having a rotary drive for a first workpiece part, and a further clamping device for a further, in particular a second workpiece part, and an indexing device for mutually converging the clamping devices.

In order for the mentioned objective to be achieved, it is claimed according to the features in the characterizing part of claim 1 that the pressure welding device has a measuring means measuring in a contactless manner for detecting the surface property and/or the true running and/or the axial runout in a front-end welding region of a workpiece part.

A method and a device for improving the quality of the weld seam in friction stir welding are known from DE 10 2012 010 836 B3, the latter emanating from the applicant, the method and the device being based on the objective of increasing the service life of the friction stir tool from approx. 2 hours to 15 hours, and to increase the quality of the joint seam such that no post-processing at all is required. This is achieved by a device having the following features:

a) a receptacle plate (1) having a drive head (2) and a spindle bearing (4) for receiving a friction welding tip (9), wherein a helically machined conveying screw (6) which serves for conveying away any non-required material application in the spindle bearing (4) opens into openings (8) which obliquely lead to the outside;

b) the longitudinal axis of the spindle bearing (4) in relation to the vertical is inclined by an angle of 2.8 to 3.2 degrees;

c) the sliding face of the rotating spindle is composed of a planar sliding face (10) and, in particular in order to weld curved seams from in each case one inherently vaulted sliding face (11) adjoining on two opposite sides, each of said sliding faces (11) being inclined at an acute angle toward the sliding face (11);

d) the friction stir welding tip (9) has the shape of a truncated cone in which the covering area is raised in the center, and wherein the surface area of the truncated cone is formed by six trapezoidal area pieces, of which three area pieces each lie opposite one another at an angle of 120 degrees, being uniformly distributed on the circumference, and occupy a proportion of more than ⅙ on the circular circumference.

In order for the axial contact pressure and the torque arising in friction stir welding to be controlled in a precise manner, it is important that the process parameters at the point of the welding process are known. This is difficult above all when measuring force, torque, or the like, in the case of the components to be joined must be performed close to the welding action, such as in three-dimensional applications, for example, in which complex compensation of the dead weights of the spindle and of the tool must otherwise be performed.

Should dissimilar tools be required for friction-stir welding in a production process, dissimilar process parameters have to be considered in the case of each tool change. Therefore, the respectively required process parameters must be rapidly determined in the case of a tool change, and the production has to be immediately set to the modified process parameters.

The present invention is therefore based on the object of optimizing the welding procedure in the case of friction stir welding in such a manner that the relevant process parameters in the case of a tool change, such as the arising axial force of the tool, the arising torque, and the temperature of the welding-pin tip may be set rapidly and accurately also after a tool change.

This object is achieved by the device as claimed in claim 1, i.e.

a device for quick and reliable tool changing in the process of friction stir welding, having the following features:

a) a robot (1) having a robotic pivoting head (2) and a friction-stir welding head (3) which is fastened to the robotic pivoting head (2), having a welding shoe (13), wherein the robot (1) in each case may select a specific friction-stir welding head (2) from a tool magazine (4);

b) a device for detecting the mechanical forces on the welding-pin tip (14) of each welding shoe (13) of a friction-stir welding head (2), wherein a sensor (16) is attached to that side of the tool bell (11) that is counter to the flow direction of the welding process, wherein a sensor (21) for measuring the torque engaging on the pin receptacle cone (26) and of the bending torque arising here is provided, and wherein furthermore a sensor (25) in the pin receptacle cone (26), and a piezoelectric force-measuring sensor (24) in the longitudinal axis of the pin shaft (27), for measuring the axial force acting on the welding-pin tip, are provided;

c) an RFDI-code for identification, attached to the pin shaft (27) of each welding shoe (13);

d) a replacement runner (28) provided on each welding shoe (13).

It is furthermore claimed that the sensor (16) has an associated measurement amplifier (15) having an antenna which relays the measured signals, and it is likewise claimed that the tool bell (11) has a sensor-signal amplifier having a rotary antenna (22) for receiving, for amplifying, and for relaying all detected measured values, wherein these measured values are routed onward from a static antenna (23) to a machine control unit. It is likewise claimed that the tool bell (11) has an inductive power supply system, for supplying power to the measuring system, that is composed of a moving secondary coil (20) and a stationary primary coil (19) and a respective power supply. It is moreover claimed that a welding-shoe replacement runner (28) is fastened to the respective welding shoe (13), on the one side by way of a cam-shaped latching step, and on the other side by means of a releasable mechanical connection (31);

or by the method as claimed in claim 6, respectively, i.e. a method for quick and reliable tool changing in the process of friction stir welding, having the following features:

e) a robot (1) selects from a tool magazine (4) a specific friction-stir welding head (3), suitable for the following welding procedure, for a workpiece that is chucked in a universal chucking device (6), approaches the tool magazine (4), and by means of a tool receptacle (7) and a docking plate (8) connects to the respective friction-stir welding head (3);

f) the robot (1) by means of the path reader (17) determines the weight of the docked friction-stir welding head (3) as a parameter for the machine control unit, and moves conjointly with the friction-stir welding head (3) to the coordinates, indicated by the machine control unit, marking the start of the following welding process;

g) during the running welding process, those physical measured values that are relevant to the welding procedure are determined by means of the sensors (16, 21, 24, 25) and are transmitted in real time to the machine control unit of the robot (1);

h) upon termination of the welding procedure the robot (1) removes the respective friction-stir welding head (3) from the workpiece, and places the friction-stir welding head (3) back in the tool magazine (4).

It is moreover claimed that an RFDI code for identification is attached to the pin shaft (27) of each welding shoe (13). It is furthermore claimed that the replacement of the sliding and smoothing face on each welding shoe (13) may be performed by means of a replacement runner (28). And it is claimed that the evaluation of the measured results of the sensor (24) may also be used for controlling the length measurement of a welding-pin tip, and in that, during or after the welding process, inlet air and/or a cleaning liquid may be infed by means of a particular connector. A computer program having a program code for carrying out the method steps, if and when the program is executed in a computer, and a machine-readable medium having the program code of a computer program for carrying out the method, if and when the program is executed in a computer, are claimed.

Figure 2:
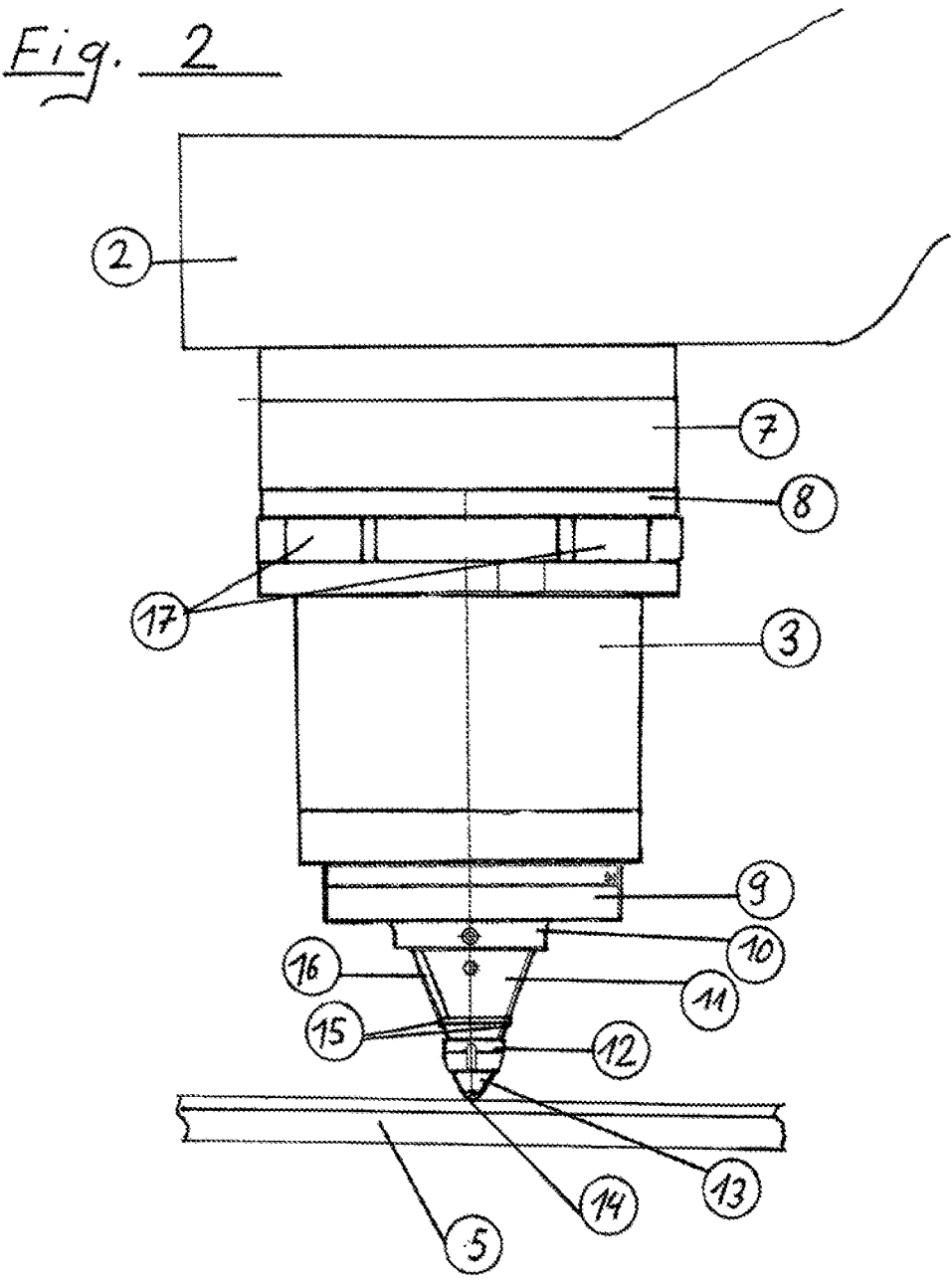
Figure 3:
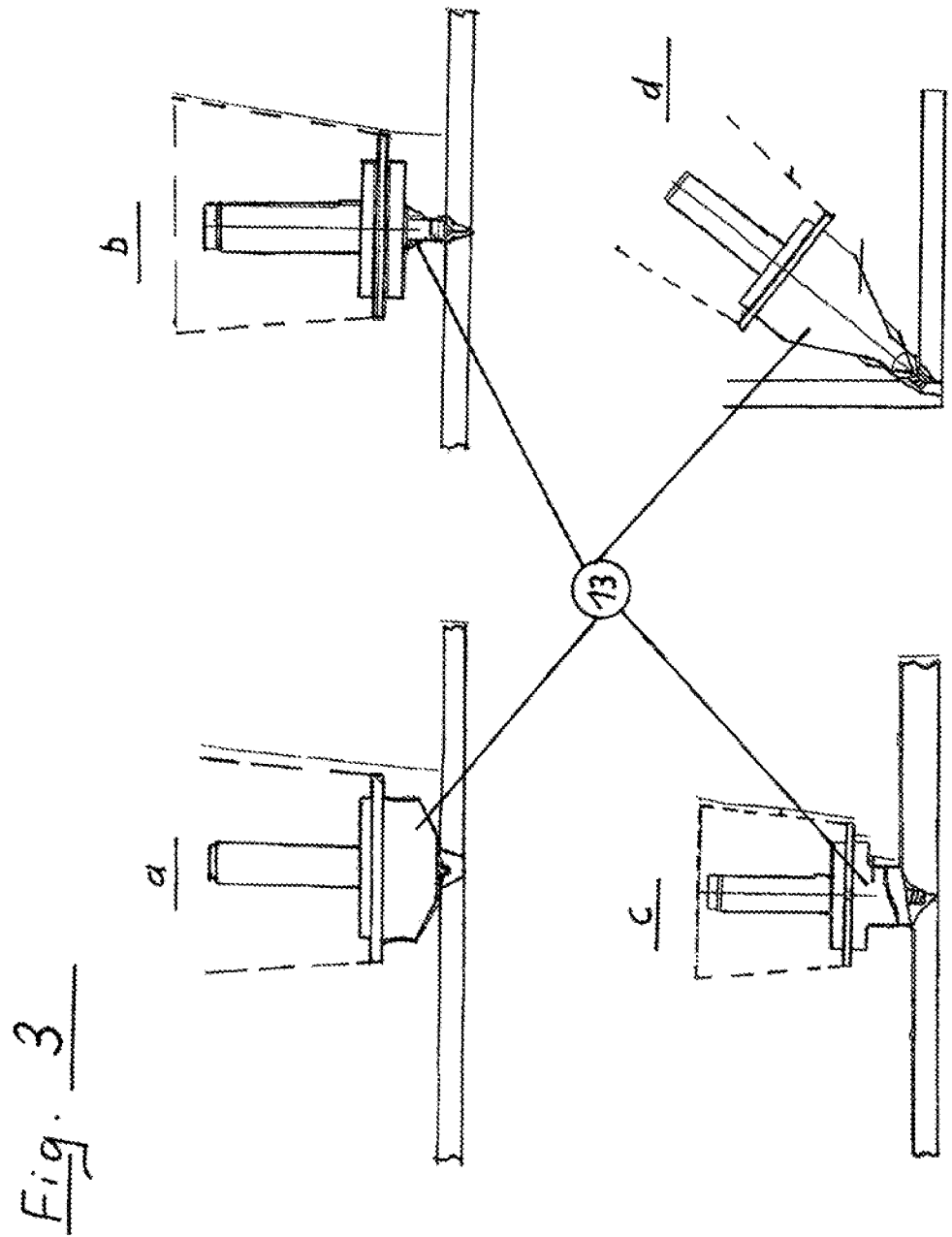
Figure 4:
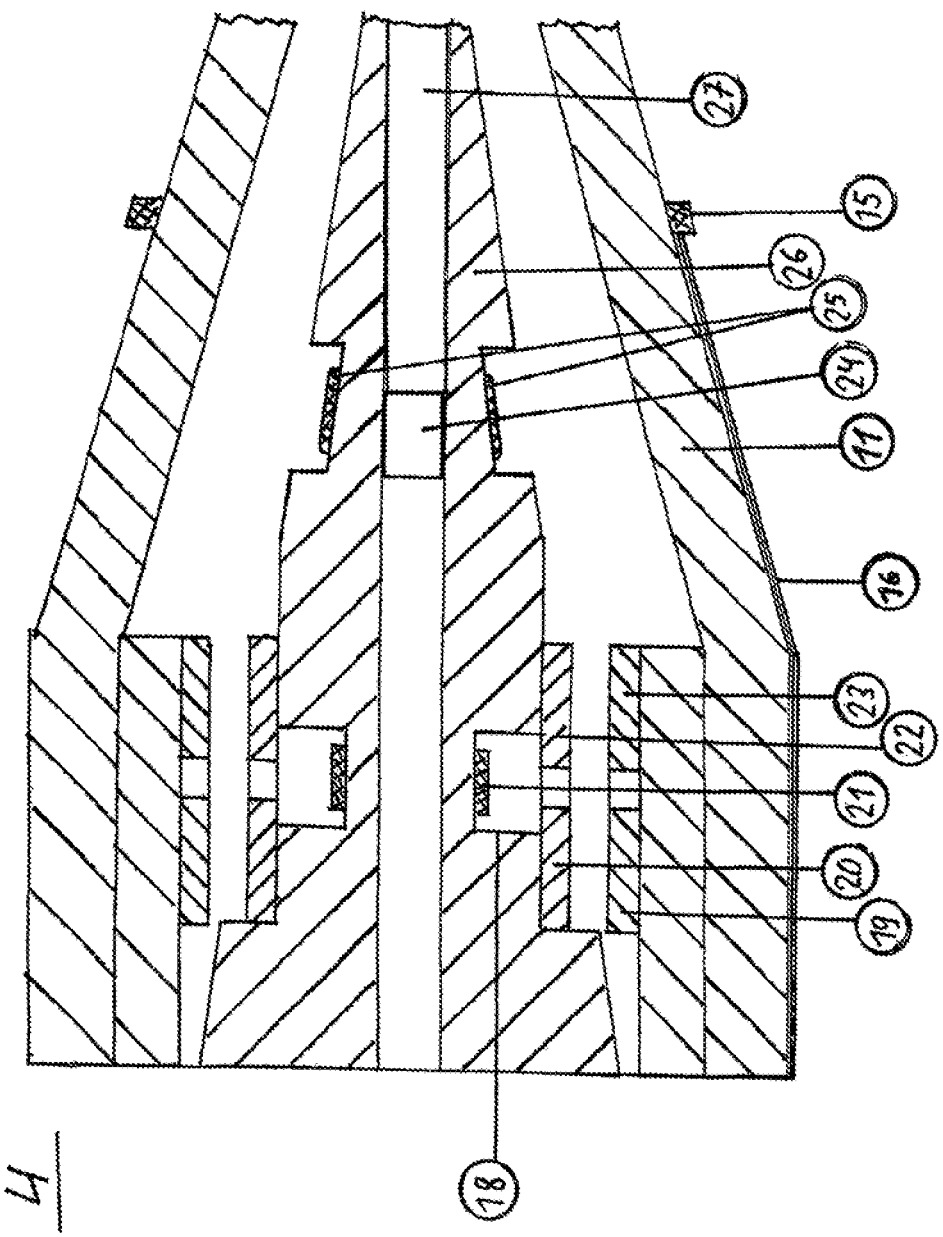
Figure 5:
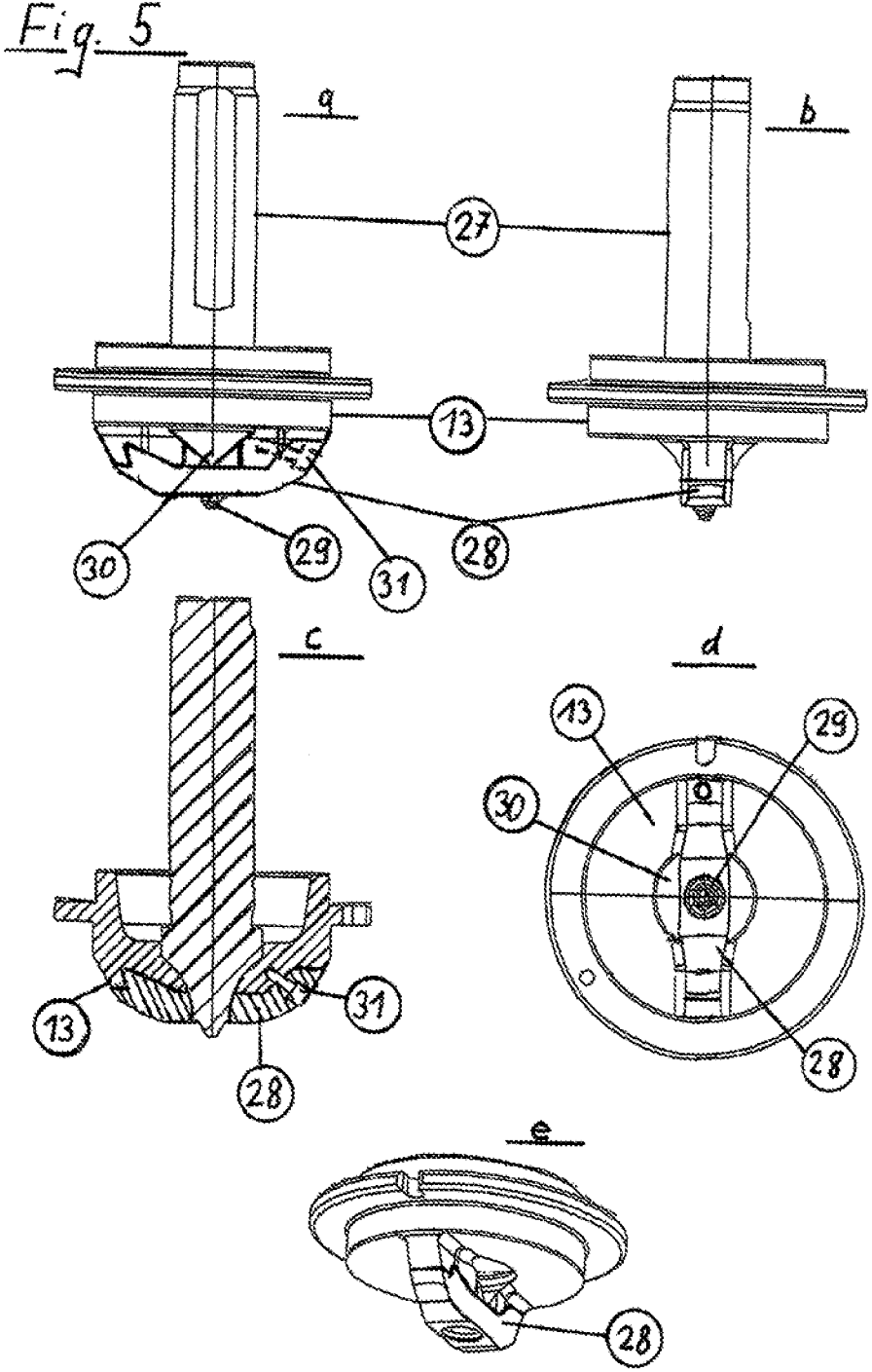
Figure 6:
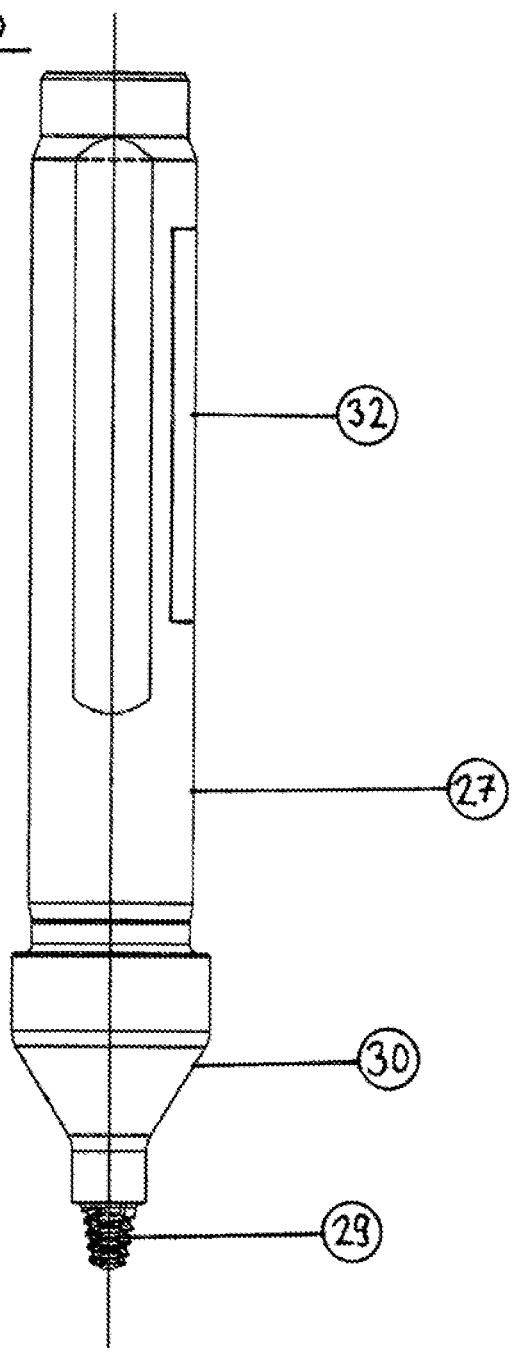

The device according to the invention will be described in more detail hereunder. In the drawings and in detail:

FIG. 1 shows a station for quick tool changing;
FIG. 2 shows the employment of a special tool;
FIG. 3 shows various dissimilar tools for friction stir welding;
FIG. 4 shows the cross section of a tool bell;
FIG. 5 shows a particular design embodiment of welding shoes 13;
FIG. 6 shows an identification measure on the pin shaft 27.

FIG. 1 shows a station for quick tool changing. The basic structure of a robot having a robotic pivoting head 2 and a friction-stir welding head 3 fastened thereto is identified by the reference sign 1 herein. A tool magazine 4 that is equipped so as to correspond to the intended welding job is located close to a universal chucking device 6 for receiving the components of a workpiece 5 that have to be joined.

FIG. 2 shows the employment of a special tool. The robotic pivoting head 2, which in this FIG. 2 is connected to a tool receptacle and docking device 7 and to an adjacent docking plate 8 for the friction-stir welding head 3, can again be seen from above, wherein path readers 17 are disposed between the docking plate 8 and the friction-stir welding head 3. The path readers 17 serve for detecting the weight suspended from the docking device 7, substantially the weight of the friction-stir welding head 3. A fastening plate 9 for a tool-bell flange 10, next to the former, is next to the friction-stir welding head 3. The tool-bell flange 10 serves for mounting a tool bell 11 which by means of a union nut 12 holds a welding shoe 13.

A welding-pin tip 14 is then mounted in the welding shoe 13, the former participating in the process of friction stir welding per se on the mating partners of a workpiece 5 that are to be joined.

A sensor 16 of linear shape can be seen as a heavy solid line at the left periphery of the tool bell 11, said sensor 16 being attached to that side of the tool bell (11) that is counter to the flow direction of the welding process, and below which sensor 16 an associated measurement amplifier 15 having an antenna that relays the measured signals is identified.

FIG. 3 shows various dissimilar tools for friction stir welding. Herein, various dissimilar welding shoes 13 for dissimilar specialized welding processes are depicted in FIGS. 3a to 3d. In this way, FIG. 3c), for example, shows a welding shoe for processing materials of dissimilar thickness, and FIG. 3d) shows a welding shoe for processing fillet welds.

FIG. 4 shows the cross section of a tool bell. Herein, a tool bell 11 having a pin receptacle cone 26 is illustrated in a stylized manner in cross section. Here again, the sensor 16, already described above, and the associated amplifier 15 having the antenna thereof can be seen in this lower half of the tool bell 11, shown herein.

In the pin receptacle cone 26 shown, having the pin shaft 27, in the comparatively wide region thereof, a notch 18 in the cone for receiving a sensor 21 can be seen. The mechanical constriction of the cross section by the notch 18 in the cone and the placing of the sensor 21 at this location enables measuring of the torque engaging on the pin receptacle cone 26, and measuring a bending torque arising herein. The transmission of the signal of the measured values that have been detected by the sensor 21 is performed by way of a rotatable signal amplifier 22 that is connected to the pin receptacle cone 26 and by a rotary antenna. Receiving and relaying the measured values that have been detected by the sensor 21 is performed by a static stationary antenna 23. A further notch, not illustrated in more detail, which provides space for a sensor 25 and which enables measuring the axial force that acts directly on the pin shaft 27 and thus on the welding-pin tip 14, is located in the front region of the pin receptacle cone 26.

A piezoelectric force-measuring sensor 24, which likewise serves for measuring the axial force and by means of which the length measurement of a welding-pin tip is also possible, is optionally located in the longitudinal axis of the pin shaft 27.

An inductive power supply serves for supplying power to the described measuring systems, the stationary primary coil of said power supply being identified by 19 and the movable secondary coil thereof being identified by 20. It may furthermore be provided that inlet air and/or a cleaning liquid may be infed by means of a particular connector during or after the welding process.

FIG. 5 shows a particular design embodiment of welding shoes 13. A side view of a welding shoe 13 which has a replaceable welding-shoe replacement runner 28 is illustrated in FIG. 5*a*, wherein rotationally symmetrical and plate-shaped inserts may also be found. Since the runner-shaped lower part of a welding shoe is subject to wear, it is provided that this runner-shaped lower part is designed so as to be replaceable. Such a welding-shoe replacement runner 28 shown on the left side herein is provided with a cam-shaped latching step, and on the opposite side is fastened by means of a releasable mechanical connection 31, for example in the form of a set screw. Furthermore to be seen herein are the pin neck 30 and the pin tip 29.

In the view of FIG. 5*b*, the same welding shoe is illustrated, having been rotated so as to be perpendicular. The pin shaft 27 is furthermore identified in both illustrations. The welding shoe 13 of FIG. 5*a*, having the welding-shoe replacement runner and the mechanical connection 31, can be seen in cross section in FIG. 5*c*. FIG. 5*d* shows the welding shoe of FIG. 5*b*, in a view from the lower side. The welding-shoe replacement runner 28, the pin tip 29, and the pin neck 30 are again identified herein.

In the illustration of FIG. 5*e*, the welding-shoe with the welding shoe replacement head 28 thereof can again be seen in a three-dimensional view from obliquely below.

FIG. 6: shows an identification measure on the pin shaft 27. In order to be able to identify specially commissioned versions of the welding shoes according to the invention, it is provided that an RFDI code 32 is attached to each such welding shoe 13 in the pin shaft 27 of the latter. The pin neck 30 and the pin tip 29 are furthermore identified in FIG. 6.

The complex control system of the motion sequences described requires a special control program.

LIST OF REFERENCE SIGNS

1 Robot
2 Robotic pivoting head
3 Friction-stir welding head
4 Tool magazine
5 Workpiece
6 Universal chucking device for receiving the workpiece
7 Tool receptacle and docking device
8 Docking plate for the friction-stir welding head 3
9 Fastening plate for the tool-bell flange
10 Tool-bell flange
11 Tool bell
12 Union nut
13 Welding shoe
14 Welding-pin tip
15 Amplifier of the measured signal of a tool bell, and antenna
16 Sensor on the tool bell (strain gauge)
17 Path readers for the docking plate 8 of the friction-stir welding head 3
18 Notch in cone, for receiving a sensor (elastic point)
19 Primary coil of the inductive power supply
20 Secondary coil of the inductive power supply
21 Sensor (DMS) for the tool-receptacle cone (pin)
22 Sensor signal amplifier and rotary antenna
23 Static antenna
24 Piezoelectric force-measuring sensor
25 Sensor for measuring the axial force
26 Pin receptacle cone
27 Pin shaft
28 Welding shoe—replacement runner
29 Pin tip
30 Pin neck
31 Releasable mechanical connection
32 RFDI code

The invention claimed is:

1. A device for tool changing in a friction stir welding process, comprising:
   a) a robot (1) having a robotic pivoting head (2) and a friction-stir welding head (3) which is fastened to the robotic pivoting head (2), having a welding shoe (13), wherein the robot (1) is adapted to select an appropriate friction-stir welding head (2) from a tool magazine (4);
   b) a device for detecting mechanical forces on a welding-pin tip (14) of each welding shoe (13) of a friction-stir welding head (2), wherein a sensor (16) is attached to a side of a tool bell (11) that is opposite a flow direction of the welding process, wherein a sensor (21) for measuring a torque engaging on a pin receptacle cone (26) and of a bending torque arising here is provided, and wherein furthermore a sensor (25) in the pin receptacle cone (26), and a piezoelectric force-measuring sensor (24) in a longitudinal axis of a pin shaft (27), for measuring an axial force acting on the welding-pin tip, are provided;
   c) an RFID-code for identification, attached to the pin shaft (27) of each welding shoe (13);
   d) a replacement runner (28) fastened to each welding shoe (13).

2. The device as claimed in claim 1, characterized in that the sensor (16) has an associated measurement amplifier (15) having an antenna which relays measured signals.

3. The device as claimed in claim 1, characterized in that the tool bell (11) has a sensor-signal amplifier having a rotary antenna (22) for receiving, for amplifying, and for relaying all detected measured values, wherein these measured values are routed onward from a static antenna (23) to a machine control unit.

4. The device as claimed in claim 1, characterized in that the tool bell (11) has an inductive power supply system, for supplying power to a measuring system, that is composed of a moving secondary coil (20) and a stationary primary coil (19) and a respective power supply.

5. The device as claimed in claim 1, characterized in that a welding-shoe replacement runner (28) is fastened to the respective welding shoe (13), on one side by way of a cam-shaped latching step, and on an opposite side of the cam-shaped latching step by means of a releasable mechanical connection (31).

* * * * *

UNITED STATES PATENT AND TRADEMARK OFFICE
CERTIFICATE OF CORRECTION

PATENT NO. : 10,183,357 B2  
APPLICATION NO. : 15/319624  
DATED : January 22, 2019  
INVENTOR(S) : Markus Weigl Page 1 of 1

It is certified that error appears in the above-identified patent and that said Letters Patent is hereby corrected as shown below:

On the Title Page  
Item (71), Under Applicant: delete "Ashbach-Baeumenheim (DE)" and insert  
-- Asbach-Baeumenheim (DE) -- in place thereof.

Signed and Sealed this  
Twenty-third Day of April, 2019

Andrei Iancu  
*Director of the United States Patent and Trademark Office*